United States Patent [19]
Pettus

[11] Patent Number: 4,997,619
[45] Date of Patent: Mar. 5, 1991

[54] SHIELD FOR A NUCLEAR REACTOR

[75] Inventor: William G. Pettus, Monroe, Va.

[73] Assignee: The Babcock & Wilcox Company, New Orleans, La.

[21] Appl. No.: 421,030

[22] Filed: Oct. 13, 1989

[51] Int. Cl.$^5$ .................................... G21C 11/00
[52] U.S. Cl. .................................. 376/288; 250/518.1
[58] Field of Search ............... 376/288, 287, 339, 338; 252/478; 250/515.1, 518.1, 519.1

[56] References Cited

U.S. PATENT DOCUMENTS

| H558 | 12/1988 | Coomes et al. | 376/288 |
|---|---|---|---|
| 2,853,624 | 9/1958 | Wigner et al. | 376/288 |
| 2,977,297 | 3/1961 | Evans et al. | 376/287 |
| 3,080,308 | 3/1963 | Dickinson | 376/402 |
| 3,654,464 | 4/1972 | Johnson, Jr. et al. | 376/160 |
| 3,786,258 | 1/1974 | Schmidt | 376/342 |
| 3,857,442 | 12/1974 | Sturiale et al. | 376/287 |
| 4,447,734 | 5/1984 | Kusumegi et al. | 376/288 |
| 4,495,140 | 1/1985 | Kochka et al. | 376/207 |
| 4,743,423 | 5/1988 | Turner et al. | 376/288 |

Primary Examiner—Daniel D. Wasil
Attorney, Agent, or Firm—Robert J. Edwards; D. Neil LaHaye

[57] ABSTRACT

A shield for a gas cooled nuclear reactor. The reactor vessel head is provided with two regions of material which act in synergism to reflect neutrons back to the core, attenuate gamma rays and neutrons, and allow heat recovery. The primary region attenuates gamma rays and provides significant neutron attenuation. The secondary region provides the residual neutron attenuation.

7 Claims, 2 Drawing Sheets

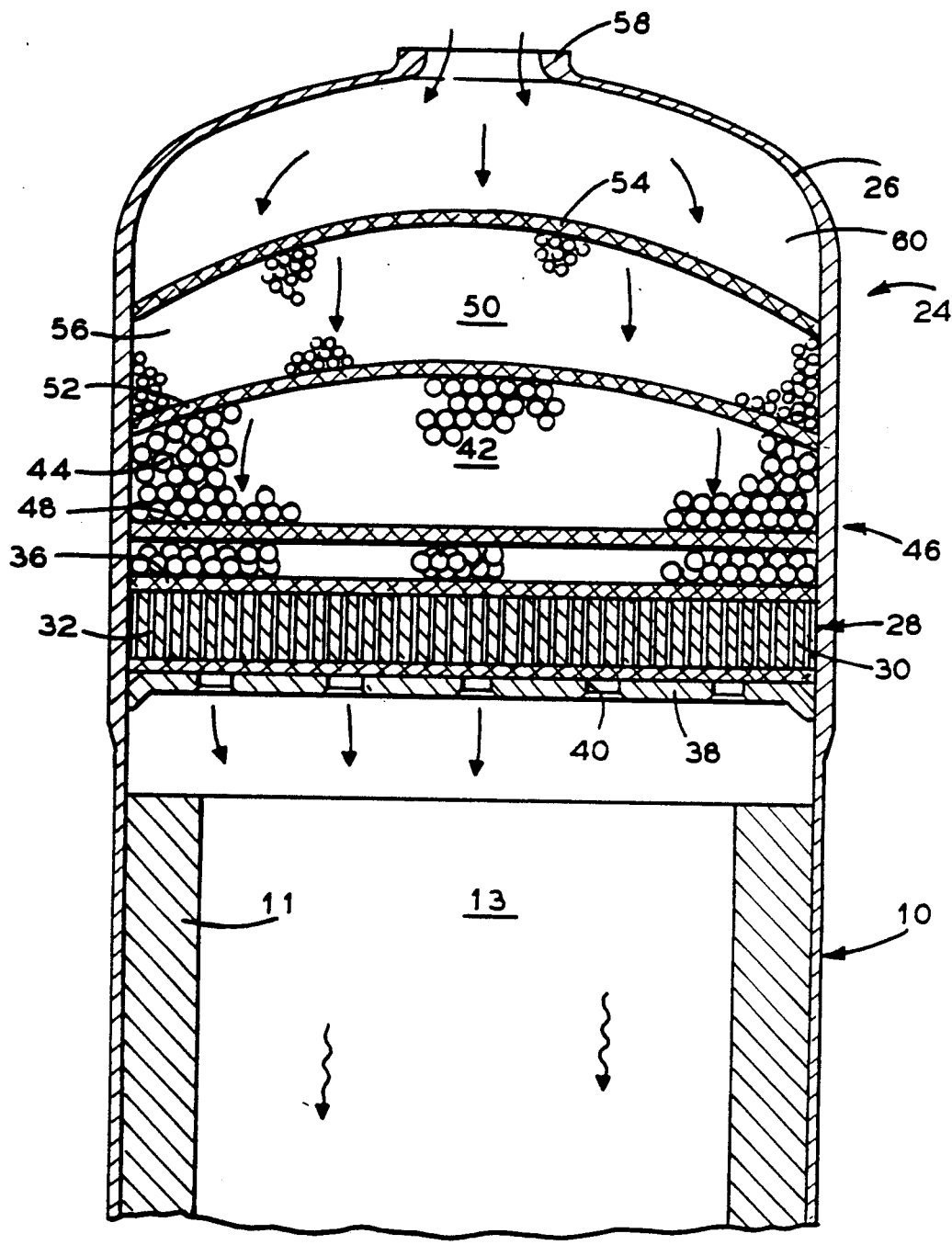

SHIELD FOR A NUCLEAR REACTOR

BACKGROUND OF THE INVENTION

1. Field of the Invention

The invention is related generally to nuclear reactors and in particular to radiation shields for space nuclear reactors.

2. General Background

In nuclear reactors, a reflector is generally placed around the core to reduce neutron leakage from the core and massive shields are utilized to protect critical areas from ionizing radiation dangerous to personnel or damaging to sensitive equipment.

Particularly in nuclear reactors designed for use in space applications, the size and mass is severely limited by mission requirements, launch vehicle limitations, and the cost of placing massive components into orbit and then assembling them into operating systems. For a small power reactor of about 100 KWe the required shield mass is about 25% of the reactor mass on an unmanned station. On manned stations or for reactors of greater power the relative mass of the shield is greater and then may become the limiting component.

Typical space reactor designs use radiation "Shadow" shields external to the reactor containment with the heat developed in the shield being dissipated by thermal radiation from the surface. The problems of neutron and gamma ray shielding are typically dealt with separately by the use of lithium hydride as the neutron shield and tungsten metal as the gamma ray shield. It can be seen from the above that there is a need for compact shield designs that minimize the overall system mass.

SUMMARY OF THE INVENTION

The invention solves the aforementioned problem in a straightforward manner for gas cooled space power and propulsion reactors. What is provided is an integral reactor vessel head and radiation shadow shield. The radiation shield is comprised of a primary shield designed to fully satisfy the gamma ray attenuation requirement and substantially satisfy the neutron attenuation requirement, and a secondary shield designed to satisfy the residual neutron attenuation requirement. The primary shield consists of a porous packed bed of small spheres of a metal hydride, preferably zirconium hydride. The secondary shield is comprised of a similar bed of borohydride spheres, preferably lithium borohydride. Heat deposited in the two regions by neutron and gamma ray attenuation is recovered by the reactor coolant flow and contributes to useful power output of the reactor.

BRIEF DESCRIPTION OF THE DRAWINGS

For a further understanding of the nature and objects of the present invention, reference should be had to the following description, taken in conjunction with the accompanying drawings, in which like parts are given like reference numerals and, wherein:

FIG. 2 is a partial cutaway view of the reactor and shield.

DETAILED DESCRIPTION OF THE PREFERRED EMBODIMENT

Figure 1:
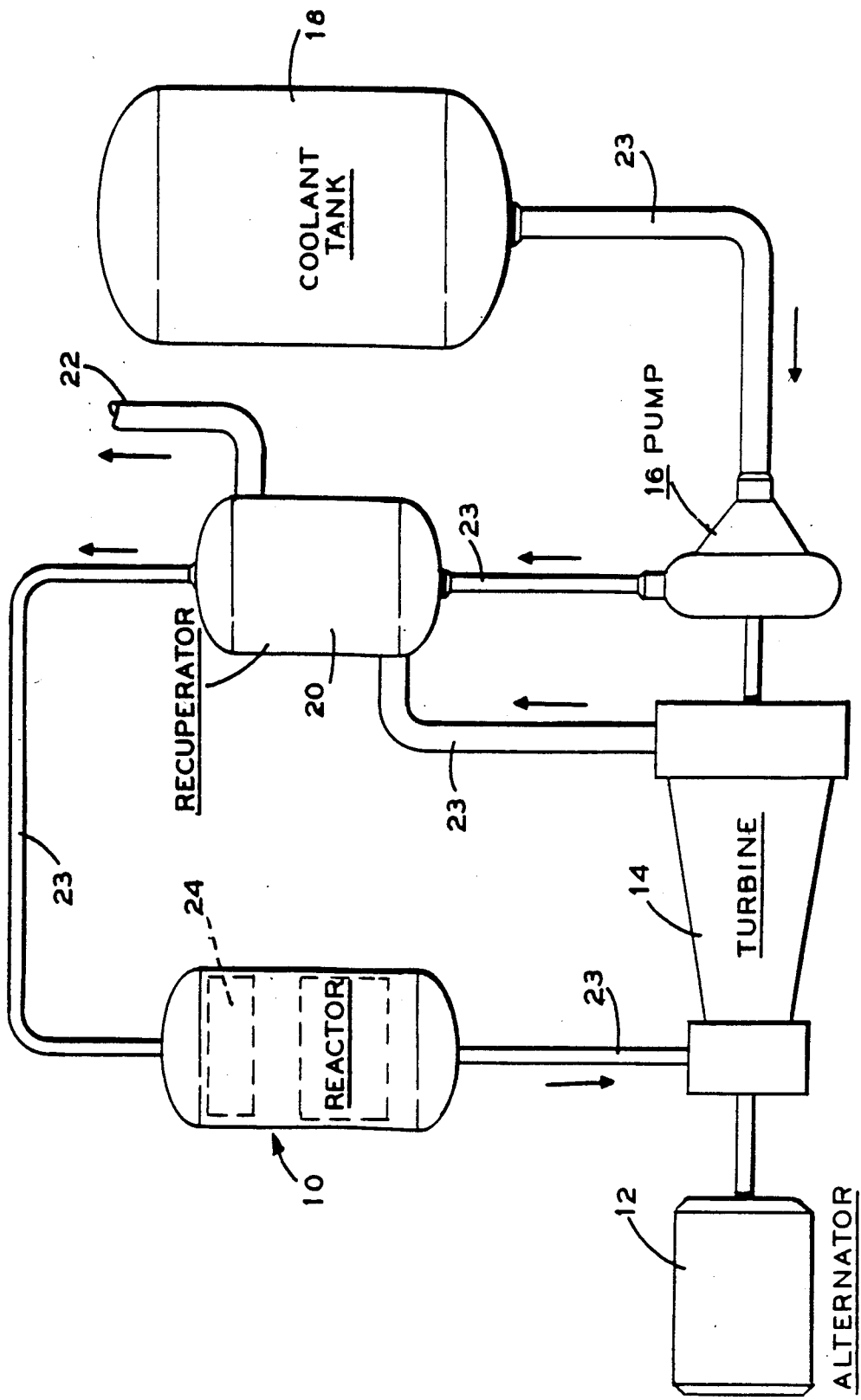
FIG. 1 is a schematic view of an open cycle space power reactor system.

Referring to the drawings, it is seen in FIG. 1 that a typical open cycle space power reactor system is generally comprised of reactor 10, alternator 12, turbine 14, pump 16, coolant tank 18, recuperator 20, and vent 22. Coolant flows through lines 23 to the various elements of the system to generate power in a manner known in the industry. The reactor is positioned and oriented so that the shield is most effective in reducing radiation levels in manned compartments or other critical areas.

The present invention, generally designated by the numeral 24 in FIG. 2, provides for a modification of reactor 10. In addition to the normal radial reflector II and axial reflector 28 around core 13, shield 24 is provided in integral reactor vessel head 26, which is sized to receive shield 24. Shield 24 is generally separated into two separate regions containing materials which act synergistically with the axial reflector 28 to reduce the leakage of neutrons from the core and to limit gamma ray and neutron radiation levels in vital areas of the space vehicle. Beryllium or beryllium alloys or compounds are preferred for the axial reflector because of their favorable neutron scattering properties and their relatively low density.

As seen in FIG. 2, the axial reflector material 30 is provided with channels 32 for coolant flow. Core grid plate 38 is provided with apertures 40 which distribute coolant flow into the reactor core.

Primary shield region 42, adjacent to and upstream of axial reflector 28, contains gamma ray and neutron attenuation material 44 preferably in the form of a packed bed of small spheres of a size range which allows adequate passages for coolant and an acceptable pressure drop through the system. Although previously proposed gamma radiation shields have specified a dense high atomic number metal such as tungsten in a separate region, the synergy of the invention is best accomplished by a medium atomic number metal hydride having the lowest possible neutron absorption cross section and serving multiple functions. This permits the downstream side of primary region 42 to supplement the reflecting function of axial reflector 28. Zirconium hydride is the preferred material to be used in this region. The zirconium component is primarily effective in gamma ray attenuation and the hydrogen component is primarily effective in neutron attenuation. The reflecting function of axial reflector 28 may also be further enhanced by the optional use of a metal deuteride in place of the corresponding metal hydride (zirconium deuteride in place of zirconium hydride) in a sub-region 46 of primary region 42 adjacent region 28. Mixing of the deuteride and hydride materials is minimized by the constraint of thick rigid screens on either side of primary region 42. However, an optional screen 48 may be positioned between the deuteride and hydride layers if it is desired. The thickness of the optional deuteride layer will depend on overall system design requirements but ordinarily will comprise only a relatively small portion of the total thickness of primary region 42. The primary function of region 42 is to attenuate gamma rays and the thickness of this region is chosen to fully accomplish this function. Due to the small neutron absorption cross section of the preferred metal, the production of secondary gamma rays by neutron capture and by the subsequent decay of activated elements is minimized. Neutron attenuation is also a major function which is accomplished by the high hydrogen concentration in primary shield region 42. In some cases the full neutron attenuation required by the primary shield may be satisfied by primary region 42 alone when its thickness is sufficient to satisfy the gamma ray attenuation requirement. In such cases, secondary shield region 50 may be omitted and integral reactor vessel head 26 shortened accordingly.

Rigid screen 52 separates primary region 42 from secondary region 50 while rigid screen 54 holds the material of secondary region 50 in position. Secondary region 50 contains neutron attenuation material 56 in the form of a packed bed of small spheres of a light-metal borohydride as in primary region 42. The preferred material for this region is lithium borohydride because of its very high hydrogen atom density per unit mass of the bulk material. The lithium and boron may also be enriched in the isotopes $^6$Li and $^{10}$B respectively for increased effectiveness.

Rigid screens 36, 52, and 54 are preferably formed from beryllium because of its high neutron scattering cross section and low neutron absorption cross section. Rigid screen 36 prevents the material in primary region 42 from entering channels 32 in axial reflector 28.

In operation, coolant flows through inlet nozzle 58 into reactor plenum 60 and respectively through regions 50, 42, and 28 as indicated by the arrows. The three regions return heat deposited therein to the coolant as it flows toward core 13 and then out reactor 10 as indicated in FIG. 1 to generate useful energy in a known manner. The two regions 42 and 50 provide for gamma ray and neutron attenuation as well as eliminating the need for a separate heat rejection system. This results in the ability to reduce the size and mass of the reactor radiation shields.

Alternative materials may also be used in the two shield regions. Hydrides of other suitable metals such as yttrium and titanium may be used as all or part of the material in primary region 42. Lithium hydride or hydrides or borohydrides of beryllium or other suitable metals may be used as all or part of the material in secondary region 50. Also, solid compacts with formed cooling channels may be used in place of the packed beds of regions 42 and 50. Vessel head 26 may also be tapered and of a larger diameter in regions 42 and 50 to provide a wider shielded zone if required.

Because many varying and differing embodiments may be made within the scope of the inventive concept herein taught and because many modifications may be made in accordance with the descriptive requirement of the law, it is to be understood that the details herein are to be interpreted as illustrative and not in a limiting sense.

What is claimed as invention is:

1. In a nuclear reactor having a core, a radial reflector, an axial reflector, and a reactor vessel head, a shield in said reactor vessel head, said shield comprising:
   a. a primary region within the reactor vessel head containing a packed bed of spheres of a metal hydride;
   b. a secondary region within the reactor vessel head adjacent to said primary region containing a packed bed of spheres of a metal borohydride, and
   c. a subregion of zirconium deuteride in said primary region.

2. The shield of claim 1, wherein the primary shielding material is zirconium hydride.

3. The shield of claim 1, wherein the secondary shielding material is lithium borohydride.

4. The shield of claim 1, wherein said primary and secondary regions are separated and held in place by rigid screens which allow redistribution of coolant.

5. In a nuclear reactor having a core, a radial reflector, an axial reflector, and a reactor vessel head, a shield in said reactor vessel head, said shield comprising:
   a. a primary region within the reactor vessel head containing a packed bed of spheres of zirconium hydride; and
   b. a secondary region within the reactor vessel head adjacent to said primary region containing a packed bed of spheres of lithium borohydride.

6. In a nuclear reactor having a core, a radial reflector, an axial reflector, and a reactor vessel head, a shield in said reactor vessel head, said shield comprising:
   a. a primary region within the reactor vessel head containing a packed bed of spheres of zirconium hydride;
   b. a secondary region within the reactor vessel head adjacent to said primary region containing a packed bed of spheres of lithium borohydride; and
   c. a subregion of spheres of zirconium deuteride in said primary region.

7. The shield of claim 6, wherein said primary and secondary regions are separated and held in place by rigid screens which allow redistribution of coolant.

* * * * *